United States Patent Office 3,300,422
Patented Jan. 24, 1967

---

3,300,422
PRODUCTION OF EXPANDED POLYAMIDES
Friedrich Bayerlein and Hans Wilhelm, Ludwigshafen (Rhine), Germany, assignors to Badische Anilin- & Soda-Fabrik Aktiengesellschaft, Ludwigshafen (Rhine), Germany
No Drawing. Filed Sept. 12, 1963, Ser. No. 308,350
Claims priority, application Germany, Sept. 19, 1962, B 68,906
2 Claims. (Cl. 260—2.5)

This invention relates to a process for the production of expanded polyamides by activated anionic polymerization of lactams in the presence of substances which form gaseous products when heated.

Several methods are already known for the production of expanded polyamides. It is possible to start from polyamide-forming compounds and to polymerize these in the presence of expanding agents. In these methods, the polymerization is carried out at high temperatures of 200° to 250° C. and for relatively long periods, as a rule several hours. The expanding agent used must not form any gaseous products under these conditions. The said methods have not acquired any technical importance because of these difficulties.

It is also known to prepare expanded polyamides by polymerizing lactams having at least seven ring members in the presence of alkaline-reacting catalysts, activators and substances which form gaseous products when heated. The polymerization of lactams in the presence of activators and catalysts is usually known as activated anionic polymerization. The particular advantage of activated anionic polymerization is that it usually proceeds rapidly and that after even less than one minute melts are obtained having a viscosity sufficiently high for expansion. In this method there is therefore no need to rely on expanding agents which do not yield gaseous products until temperatures are reached which are above the softening point of the said polyamides. Expanded polyamides having a minimum unit weight of about 0.2 may be prepared by this method; the method is not suitable for the production of expanded polyamides having unit weights of less than 0.2, for example of 0.1 or 0.05. Moreover the pore structure of such polyamides is not always uniform.

It is an object of this invention to prepare expanded polyamides having unit weights of less than 0.2. Another object of the invention is to prepare expanded polyamides which have not only a low unit weight but also a particularly high toughness and strength. It is a further object of this invention to prepare expanded polyamides having very uniform pore structure.

The objects of the invention are achieved by heating a mixture of:

(A) A lactam having seven to fourteen ring members,
(B) Catalysts,
(C) Activators and
(D) Substances which form gaseous products when heated, to temperatures between the melting point of the lactam and 200° C., and the polymerization with the expansion of the melt in the presence of 0.05 to 5%, preferably 0.5 to 2.5%, by weight of calcined gypsum with reference to the total amount of the polyamide-forming initial materials.

By calcined gypsum we mean the hemihydrate $CaSO_4 \cdot \frac{1}{2} H_2O$ which is formed by heating gypsum to 100° C.

The process according to this invention may be carried out continuously or batchwise. For example the practically anhydrous molten polymerization mixture consisting of (A) one or more lactams, (B) an alkaline catalyst, (C) an activator, (D) a substance which forms gaseous products when heated, (E) 0.05 to 5% by weight of calcined gypsum and if desired (F) additives may advantageously be heated for a few minutes at temperatures between the melting point of the lactams used and about 200° C. It is preferable to use temperatures between about 80° and about 160° C.

For example the expanded article may be prepared by dissolving an expanding agent in a lactam melt containing catalyst which has a temperature below the polymerization temperature. Liquid expanding agents should boil in the range of the polymerization temperature, i.e., above the temperature of the lactam melt. The boiling temperature of the expanding agent is determined by the temperature range in which the liquid dispersed in the lactam or polyamide boils. These boiling temperatures often are quite considerably above the boiling points of the pure liquid expanding agents. Moreover they may be increased by the use of superatmospheric pressure or lowered by the use of subatmospheric pressure. The molten polymerization mixture containing expanding agent may then be poured into molds, which may be heated, and polymerized therein. The molds may be open or closed. Polymerization proceeds in a few minutes as a rule. At the same time the expanding agent develops a vapor pressure. The polyamide thus expands and fills the mold. Polymerization, expansion and molding thus all take place simultaneously when working in this way.

Preparation of the expanded articles may also be carried out continuously by causing the molten polymerization mixture containing expanding agent to polymerize in screw extruders and extruding the viscous expandable melts through dies. It is advantageous to effect only partial polymerization of the lactam melt in the screw extruder and to complete the polymerization after extrusion. After extrusion, the melt is polymerized completely and expands at the same time. It is possible to press the melt onto supports, for example endless conveyer belts or rotating cylinders, and to allow polymerization and expansion to take place thereon. The supports are advantageously heated or passed through heated chambers. It is not essential for the expansion to take place on the support.

It is also possible for example to extrude the melt vertically into a heating shaft or into a bath of liquid and to draw off the porous profile as soon as it has sufficient strength. The expandable melts may for example be extruded in the form of strips, boards, tubes or strands, or the coating of surfaces or sheathing of wires may be carried out in this way. Circulating hollow molds may also be periodically filled and emptied again after expansion has taken place. In the case of continuous processing, the screw extruder may be supplied with a finished mixture containing catalyst, activator and expanding agent, or the said additions, for example expanding agent or polymerization catalyst, may be admixed in the screw extruder.

Examples of catalysts suitable for the production of expanded polyamides, and which may also be used in admixture, are: metals of Groups I-A and II-A of the periodic system of elements (Handbook of Chemistry and Physics, 38th edition, 1956–1957, pages 394–395), such as sodium, potassium, calcium or alkaline-reacting compounds of these metals, for example potassamide, sodium alcoholates, sodium hydroxide or the organometallic compounds of metals of Groups I-A, II-A and III-A of the periodic system of elements (ibid.). Alkali lactamates may preferably be used, which can be prepared for example by reaction of alkali metal alcoholates of alhohols having one to three carbon atoms and lactams. The catalysts may advantageously be used in amounts of from 0.05 to 5% by weight with reference to the total weight of the polyamide-forming initial materials.

Suitable activators which alone are not capable of initiating the anionic polymerization of lactams but which enhance the effect of the catalysts are, e.g., acyl-lactams, such as acetylcaprolactam, and monoisocyanates and polyisocyanates, such as phenyl isocyanate or hexamethylene diisocyanate, or acid derivatives, such as carboxylic acid halides, carboxylic esters or acid anhydrides, but particularly substituted ureas, thioureas, guanidines and urethanes. Examples of these compounds which it is preferred to use are: hexamethylene-1,6-bis-carbamidocapryllactam or phenylcarbamidocaprolactam. Such compounds may be prepared for example in conventional manner by reaction of isocyanates with lactams.

The activators may be used, alone or in admixture with each other, in amounts of 0.001 to 15% by weight with reference to the total weight of the polyamide-forming initial materials. It is preferred to use amounts of 0.5 to 5% by weight.

Lactams having six to fourteen carbon atoms which are particularly suitable for activated anionic polymerization are for example those of omega-aminocarboxylic acids, for example caprolactam, oenantholactam, capryllactam, caprilactam, laurolactam or mixtures of the same. C-substituted lactams, for example 4-isopropylcaprolactam, ε-ethyl-ε-caprolactam or ζ-ethyl-ζ-oenantholactam or the like are also suitable. For certain purposes it is also possible to use, in admixture with the said lactams, lactams which have a chain-branching or crosslinking effect, for example alkylene-bis-lactams, such as methylene-bis-caprolactam, and analogous compounds which may be prepared by reaction of alkylene-bis-cyclohexanones, e.g., ethylene-bis-cyclohexanone, with hydroxylamine and subsequent Beckmann rearrangement.

The lactams may also be mixed with soluble or insoluble dyes and fillers of all types provided they do not impair the action of the activator-catalyst system. Suitable substances are for example the usual plastics or inter alia inorganic substances, such as glass fibers, asbestos and other substances, such as graphite, chalk, molybdenum sulfide and natural materials, such as pretreated wood meal or natural, synthetic or semisynthetic fibers. The usual stabilizers may also be incorporated.

Suitable expanding agents for the production of expanded polyamides are those which form gaseous products at temperatures below the softening point of the polyamides in question. These are preferably liquids which are soluble in the molten lactams but are not solvents for polyamides. Suitable liquid expanding agents are aliphatic and cycloaliphatic hydrocarbons, for example hexane, octane and cyclohexane, aromatic hydrocarbons, for example benzene and toluene, and also open and cyclic ethers, for example dibutyl ether and dioxane. Liquids having very low boiling points, such as pentane, are also suitable if mixing with the lactams is carried out under superatmospheric pressure and the lactam is at least partly polymerized under pressure. Hydroxyl compounds, for example methanol or ethanol, are unsuitable as expanding agents because they disturb the base-catalysed polymerization.

Solid compounds which decompose with the liberation of gas when heated may also be used as expanding agents, for example azoisobutyronitrile, benzenesulfonic acid hydrazide and arylsulfazides. Mixtures of solid and liquid expanding agents are also very effective. About 1 to 15 parts by weight of expanding agent may be used to 100 parts of lactam. It is advantageous to use about 2 to 8 parts by weight.

The new expanded polyamides may be used with advantage where not only a low unit weight but also a particularly high toughness and strength are desired, for example for the production of molded articles, boards or self-supporting constructional elements to replace wood and for insulating purposes.

The invention is further illustrated by the following examples in which the parts specified are parts by weight.

*Example 1*

85 parts of sodium caprolactam is dissolved in 4700 parts of molten caprolactam. 50 parts of finely powdered calcined gypsum (hemihydrate $CaSO_4 \cdot \tfrac{1}{2}H_2O$) and 600 parts of gasoline (boiling point 40° to 140° C. at 760 mm. Hg) are then stirred into the solution at 130° C. 192 parts of hexamethylene-1,6-bis-carbamidocaprolactam is then intimately mixed therewith at the same temperature. The whole begins to polymerize and expand immediately. A white expanded article is formed having a unit weight of 0.05 to 0.06; it has great strength and uniform pore distribution.

*Example 2*

50 parts of sodium caprolactam is dissolved in 1500 parts of molten caprolactam. 33 parts of finely powdered calcined gypsum ($CaSO_4 \cdot \tfrac{1}{2}H_2O$) and a mixture of 100 parts of petroleum ether and 100 parts of toluene are stirred into the solution at 130° C. Then 64 parts of molten hexamethylene-1,6-bis-carbamidocaprolactam is introduced into the mixture heated to 130° C. and intimately mixed therewith. The whole polymerizes after a few seconds with expansion and a white expanded article having a unit weight of 0.12 is obtained.

*Example 3*

50 parts of sodium caprolactam is dissolved in 1500 parts of molten caprolactam and this solution is mixed at 135° C. with 8.3 parts of finely powdered calcined gypsum ($CaSO_4 \cdot \tfrac{1}{2}H_2O$) and 200 parts of dioxane. Then 64 parts of molten hexamethylene-1,6-bis-carbamido-caprolactam is added to the mixture heated to 130° C. and intensely mixed.

The mixture polymerizes and expands after a few seconds. A white expanded article having a unit weight of 0.10 is obtained.

*Example 4*

50 parts of sodium caprolactam is dissolved in a melt of 1100 parts of caprolactam and 320 parts of capryllactam. This solution is mixed at 130° C. and 16.6 parts of finely powdered calcined gypsum ($CaSO_4 \cdot \tfrac{1}{2}H_2O$) and 200 parts of petroleum ether (boiling point 40° to 160° C. at 760 mm. Hg). 64 parts of molten hexamethylene-1,6-bis-carbamidocaprolactam is then mixed with the mixture heated to 130° C.

The mixture polymerizes with expansion after a few seconds to give a white expanded article having a unit weight of 0.09.

We claim:

1. In a process for production of expanded polyamides by the activated anionic polymerization of one or more lactams with 7–14 ring members at temperatures between the melting point of said lactam and 200° C. with an alkaline catalyst, a polymerization activator and a blowing agent decomposable or volatilizable at said temperatures with foaming of the polymerization mass by said blowing agent as the polymerization reaction proceeds, the improvement which comprises distributing in said lactam 0.05–5% by weight, with reference to said lactam, of calcium sulfate hemihydrate.

2. A process as claimed in claim 1 wherein said lactam is caprolactam.

References Cited by the Examiner
UNITED STATES PATENTS

| | | | |
|---|---|---|---|
| 1,880,601 | 10/1932 | Untiedt | 260—723 |
| 2,205,722 | 6/1940 | Graves | 260—37 |
| 2,311,233 | 2/1943 | Jaenicke et al. | 260—2.5 |
| 2,594,280 | 4/1952 | Beaudet | 260—2.5 |
| 2,664,406 | 12/1953 | Armstrong | 260—2.5 |
| 2,846,332 | 8/1958 | Nesty | 260—37 |
| 3,017,391 | 1/1962 | Mottus et al. | 260—2.5 |
| 3,061,592 | 10/1962 | Schnell et al. | 260—78 |
| 3,062,682 | 10/1962 | Morgan et al. | 260—2.5 |
| 3,166,533 | 1/1965 | Wichterle et al. | 260—78 |
| 3,207,729 | 9/1965 | Giberson | 260—2.5 |
| 3,214,415 | 10/1965 | Giberson | 260—2.5 |

MURRAY TILLMAN, *Primary Examiner.*

SAMUEL H. BLECH, *Examiner.*

M. FOELAK, *Assistant Examiner.*